(12) United States Patent
Gobara

(10) Patent No.: US 7,579,985 B2
(45) Date of Patent: Aug. 25, 2009

(54) POSITIONING APPARATUS, CONTROL METHOD OF POSITIONING APPARATUS, CONTROL PROGRAM FOR POSITIONING APPARATUS, AND COMPUTER READABLE RECORDING MEDIUM FOR STORING CONTROL PROGRAM FOR POSITIONING APPARATUS

(75) Inventor: Naoki Gobara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/529,393

(22) Filed: Sep. 29, 2006

(65) Prior Publication Data
US 2007/0080857 A1    Apr. 12, 2007

(30) Foreign Application Priority Data
Oct. 6, 2005    (JP) .............................. 2005-293702

(51) Int. Cl.
G01S 5/14    (2006.01)
H04B 1/69    (2006.01)
(52) U.S. Cl. ................................. 342/357.12; 375/150
(58) Field of Classification Search ................. 375/150; 455/73, 456.1, 456.2; 701/213, 215, 207; 342/357.06, 357.12
See application file for complete search history.

(56) References Cited

U.S. PATENT DOCUMENTS

| | | | |
|---|---|---|---|
| 5,331,329 A * | 7/1994 | Volkov et al. .......... 342/357.01 |
| 5,999,561 A * | 12/1999 | Naden et al. ................ 375/142 |
| 6,289,041 B1 * | 9/2001 | Krasner ....................... 375/152 |
| 6,329,946 B1 | 12/2001 | Hirata et al. |
| 6,952,440 B1 * | 10/2005 | Underbrink ................. 375/150 |
| 2004/0041729 A1 * | 3/2004 | Rowitch ................ 342/357.15 |
| 2004/0147228 A1 * | 7/2004 | Krasner ........................ 455/73 |
| 2004/0176099 A1 * | 9/2004 | Sahai et al. ............... 455/456.1 |
| 2005/0116860 A1 * | 6/2005 | Kishimoto et al. ..... 342/357.12 |
| 2006/0114984 A1 * | 6/2006 | Gaal et al. ................... 375/240 |
| 2006/0133463 A1 * | 6/2006 | Pietila et al. ................ 375/150 |
| 2007/0046534 A1 * | 3/2007 | Ziedan et al. .......... 342/357.12 |

FOREIGN PATENT DOCUMENTS

JP    2004-340855 A    12/2004

* cited by examiner

*Primary Examiner*—Gregory C Issing
(74) *Attorney, Agent, or Firm*—Global IP Counselors, LLP

(57) ABSTRACT

A positioning apparatus for positioning a current position based on satellite signals from positioning satellites includes: positioning time unit information estimating means for estimating positioning time unit information which is the unit information received at positioning time based on the satellite orbit information and the time information; polarity reversal rate information generating means for generating polarity reversal rate information which indicates a rate of reversal of the polarity of a positioning standard code put on the satellite signals based on the positioning time unit information; positioning standard code polarity adjusting means for keeping or reversing the polarity of the positioning standard code based on the polarity reversal rate information.

8 Claims, 14 Drawing Sheets

F I G.1
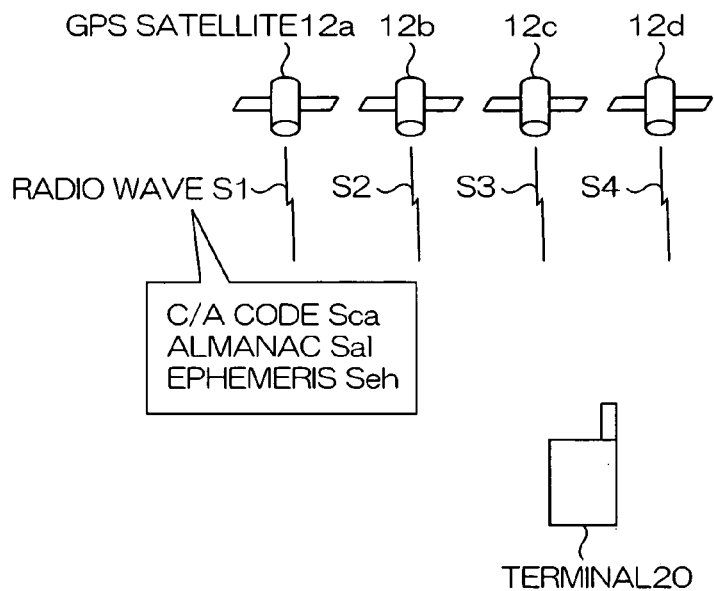
F I G.2
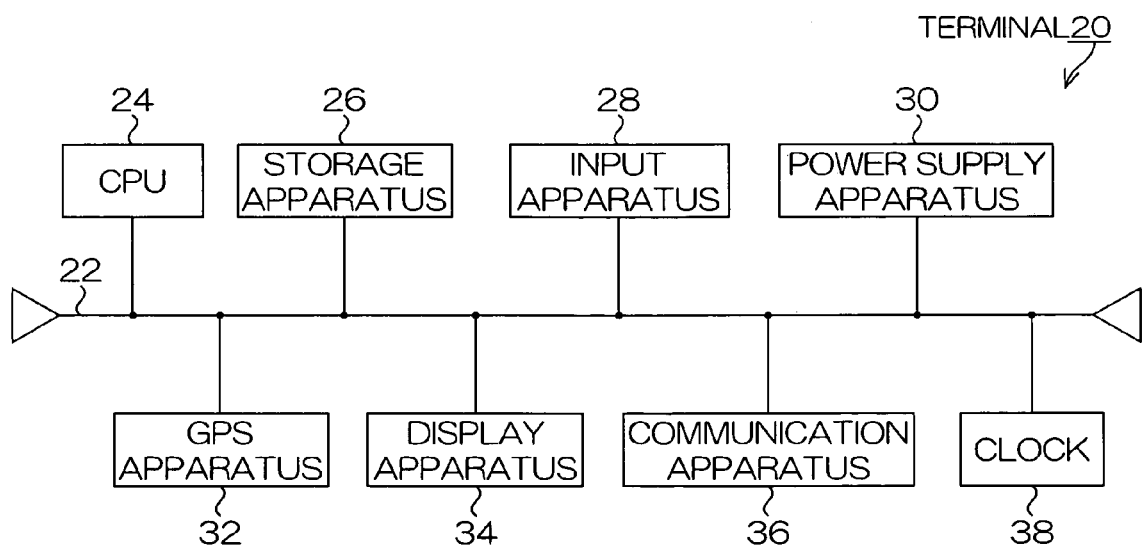

FIG.5

(a) 154a: TIME INFORMATION

| t: CURRENT TIME, TIME ACCURACY ±5sec |
|---|

(b) 154b: TIME INFORMATION

| t: CURRENT TIME, TIME ACCURACY ±5msec |
|---|

FIG.6

SF1: SUBFRAME OF EPHEMERIS 152b

| 1 | 0 | 1 | 1 | 0 | 1 | 1 | 0 | 1 | 1 | 0 | 1 | 0 |

FIG. 10
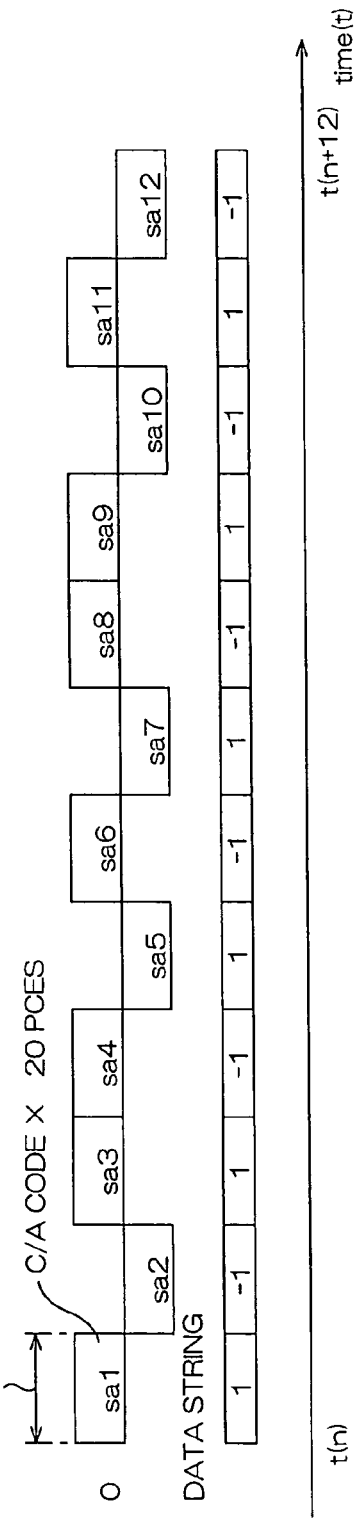
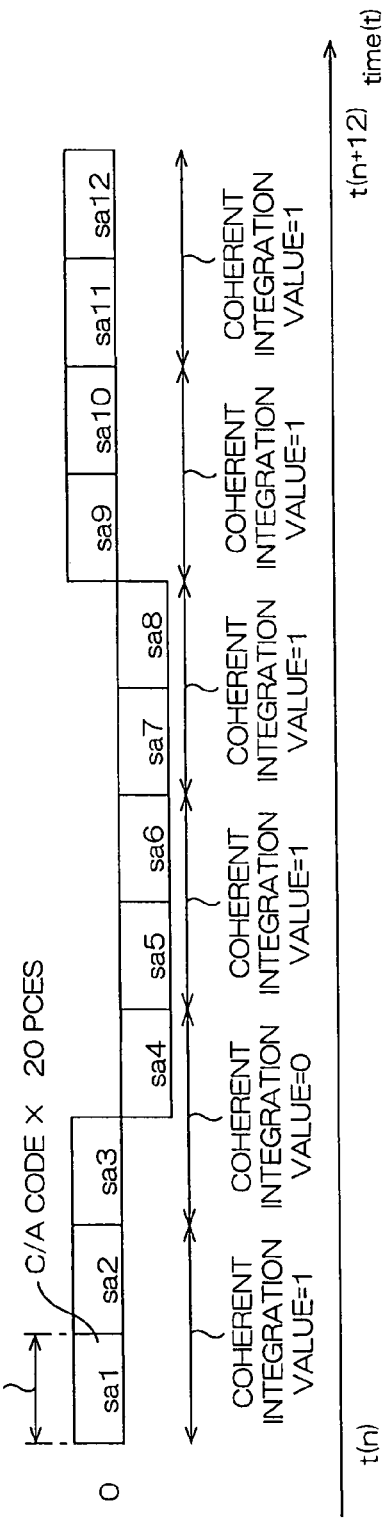

F I G.1 2

128: INCOHERENT PROGRAM

INTEGRATING COHERENT INTEGRATION VALUE $\alpha 1 \sim \alpha 300$

INCOHERENT VALUE $\beta = \alpha 1 + \alpha 2 + \cdots + \alpha 300$

F I G. 1 5
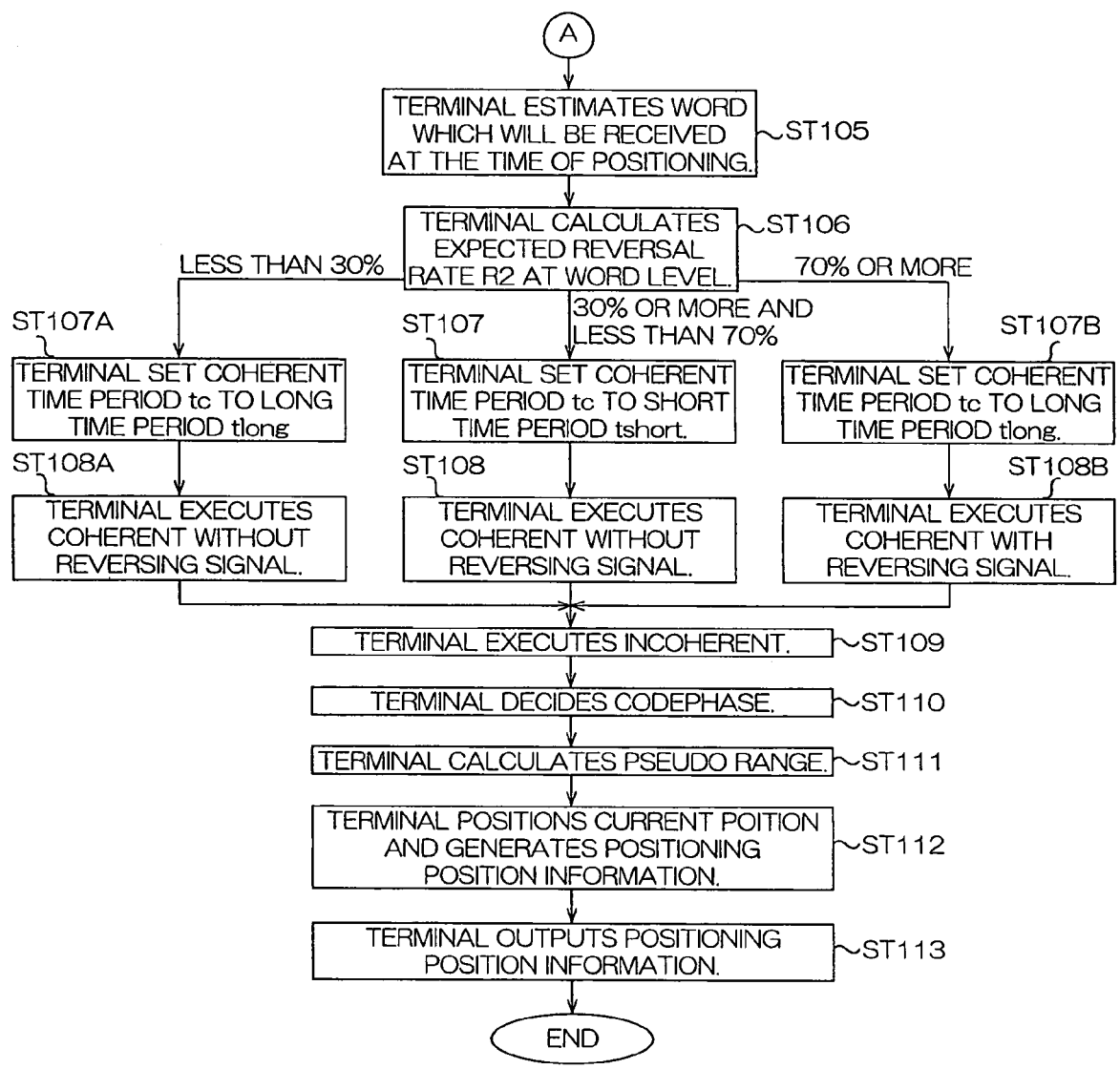

US 7,579,985 B2

POSITIONING APPARATUS, CONTROL METHOD OF POSITIONING APPARATUS, CONTROL PROGRAM FOR POSITIONING APPARATUS, AND COMPUTER READABLE RECORDING MEDIUM FOR STORING CONTROL PROGRAM FOR POSITIONING APPARATUS

This application claims the priorities benefit under 35 U.S.C. §119 of Japanese Patent Application No. 2005-293702 filed on Oct. 6, 2005, which is hereby incorporated in its entirety by reference.

BACKGROUND

1. Technical Field

The present invention relates to a positioning apparatus which uses radio waves from positioning satellites, a control method of the positioning apparatus, a control program for the positioning apparatus, and a computer readable recording medium for storing the control program for the positioning apparatus.

2. Related Art

Conventionally, positioning systems for positioning a current position of each GPS (Global Positioning System) receiver using a satellite navigation system such as GPS have been used.

Such GPS receiver receives a C/A (Clear and Acquisition or Coarse and Access) code, which is one of the pseudo random noise codes (hereinafter, referred to as PN (Pseudo random Noise code)) put on radio waves from GPS satellites (hereinafter, referred to as satellite radio waves), based on navigation messages indicating a GPS satellite orbit and the like (including rough satellite orbit information: almanac, and accurate orbit information: ephemeris). The C/A code is a code serving as a positioning standard.

The GPS receiver then identifies which GPS satellite transmits the C/A code, and calculates the distance (pseudo range) between the GPS satellite and the GPS receiver based on the time at which the C/A code is transmitted and the time at which it is received. The GPS receiver then positions the position of the GPS receiver based on the pseudo range of three or more of GPS satellites and the position of each GPS satellite on the satellite orbit (e.g., JP-A-10-339772).

Typically, coherent integration (hereinafter, referred to as coherent, simply) for correlating the received C/A code with a replica C/A code stored in the GPS receiver and integrating the correlation value, and incoherent integration (hereinafter, referred to as incoherent, simply) for integrating the result of coherent have been performed to increase the reception sensitivity (S/N ratio) of the C/A code.

Here, since both the aforementioned satellite orbit information and the C/A code are put on the satellite radio waves, the polarity of the C/A code with the bit rate of 1.023 Mbps may be reversed for every 20 msec by satellite orbit information of 50 bps. Therefore, there is a problem that the correlation values of the non-reversed C/A code and reversed C/A code compensate each other, resulting in decrease in correlation integration values obtained by the coherent processing, and thus reception sensitivity of the C/A code does not increase sufficiently.

On the other hand, a technology to increase the sensitivity by changing respective polarities of the PN signals (C/A codes) according to twenty types of pseudo patterns and synchronously adding the PN signals to changed polarities using a receiver terminal has been proposed (e.g., JP-A-2004-340855).

In addition, a technology to identify the polarities by multiplying information of navigation messages from base stations by the received C/A codes has also be proposed (e.g., U.S. Pat. No. 6,329,946B1).

However, according to the technology described in JP-A-2004-340855, only one of twenty pseudo pattern types can identify the polarity of the PN signals, it takes longer time for useless processing which is not used for positioning, and processing load of the GPS receiver increases because a large amount of data must be accumulated.

In addition, according to the technology described in U.S. Pat. No. 6,329,946B1, there is a problem that the accurate time of less than 1 msec is required for identifying a position where the navigation data reverses.

SUMMARY

Therefore, an advantage of some aspects of the invention is to provide a positioning apparatus capable of increasing the reception sensitivity of positioning standard codes despite that there is no need to accumulate a large amount of data and there is no pieces of accurate time information, a control method of the positioning apparatus, a control program for the positioning apparatus, and a computer readable recording medium for storing the control program for the positioning apparatus.

In order to achieve the above object, a positioning apparatus for positioning a current position based on satellite signals from positioning satellites according to a first aspect of the invention includes: satellite signal receiving means for receiving the satellite signals; satellite orbit information obtaining means for obtaining satellite orbit information which indicates a satellite orbit of the positioning satellite and configured with a plurality of pieces of unit information; time information obtaining means for obtaining time information; positioning time unit information estimating means for estimating positioning time unit information which is the unit information received at positioning time based on the satellite orbit information and the time information; polarity reversal rate information generating means for generating polarity reversal rate information which indicates a rate of reversal of the polarity of a positioning standard code put on the satellite signals based on the positioning time unit information; positioning standard code polarity adjusting means for keeping or reversing the polarity of the positioning standard code based on the polarity reversal rate information; coherent means for performing coherent which is a processing of calculating a correlation integration value between the positioning standard code and a replica positioning standard code stored in the positioning apparatus; incoherent information generating means for generating incoherent information by performing incoherent which is a processing of integrating a plurality of correlation integration values; and current position information generating means for generating current position information which indicates a current position of the positioning apparatus based on the incoherent information.

With the structure according to the first aspect of the invention, the positioning apparatus can generate the polarity reversal rate information based on the positioning time unit information using the polarity reversal rate information generating means.

In addition, the positioning apparatus can keep or reverse the polarity of the positioning standard code based on the polarity reversal rate information using the positioning standard code polarity adjusting means.

Moreover, the positioning apparatus can perform coherent which is a processing of calculating correlation integration values between a polarity-not-reversed or -reversed positioning standard code and a replica C/A code stored in the positioning apparatus, further perform incoherent, and generate the current position information.

As described above, the positioning apparatus performs coherent using the polarity-not-reversed or -reversed positioning standard code based on the polarity reversal rate information, allowing reduction in the number of times that the correlation values of the positioning standard code compensate each other.

This allows increase in reception sensitivity indicated in the incoherent information and generation of the accurate positioning position information.

As described above, the positioning apparatus expects the unit information at positioning time, generates the polarity reversal rate information, and does not reverse or reverses the polarity of the positioning standard code based on the polarity reversal rate information. Therefore, there is no useless processing which is not used for positioning, and there is no need to accumulate a large amount of data.

In addition, since it is only necessary for the time accuracy of the time information that can expect the unit information to be used at positioning time, accurate time information is unnecessary.

This allows increase in reception sensitivity of positioning standard code despite that there is no need to accumulate a large amount of data and there is no accurate time information.

A second aspect of the invention is a positioning apparatus with a structure according to the first aspect of the invention, which includes coherent time period deciding means for deciding a coherent time period for performing the coherent based on the polarity reversal rate information, wherein the coherent information generating means performs the coherent based on the coherent time period decided by the coherent time period deciding means.

Typically, when no compensation of signals occurs (when polarity is not reversed), signal reception sensitivity (S/N ratio) can be calculated using sensitivity formula of $10 \times \log(N) + 10 \times \log(sqrtM)$ (where sqrt indicates $\sqrt{}$), for example. In the sensitivity formula, N indicates the coherent time period, and M indicates the number of times of coherent. Since the coherent and incoherent are performed for a certain period of time, respectively, the longer the coherent time period N, the less the number of times of coherent M is, and the shorter the coherent time period N, the more the number of times of coherent M is. It is apparent from the aforementioned sensitivity formula that longer coherent time period is effective to increase reception sensitivity.

However, if compensation of signals occurs (when polarity is reversed), setting the coherent time period N to be longer in the aforementioned sensitivity formula increases a rate of compensation, resulting in further decrease in reception sensitivity. Therefore, if compensation of correlation values occurs, it is possible to further increase the sensitivity by decreasing the coherent time period N so as to increase the number of times of coherent M.

With the structure according to the second aspect of the invention, the positioning apparatus can decide the coherent time period based on the polarity reversal rate information using the coherent time period deciding means. Accordingly, the coherent time period can be set so as to increase reception sensitivity based on the polarity reversal rate information.

A third aspect of the invention is a positioning apparatus with the structure according to any of the first and the second aspect of the invention, wherein the time information includes current time information which indicates a current time, and time accuracy information which indicates time accuracy of the time information, and includes unit information type selecting means for selecting a type of the unit information based on the time accuracy information.

The shorter the code length of the unit information, the more accurate the polarity reversal rate information is generated, allowing adjustment of the polarity of the positioning standard code and determination of the coherent time period. In addition, the higher the time accuracy of the time stored in the positioning apparatus, the shorter the code length of the unit information can be selected.

With the structure according to the third aspect of the invention, the positioning apparatus can select a type of the unit information in accordance with time accuracy of the time information, allowing further increase in reception sensitivity of the positioning standard code.

In order to achieve the above object, a control method of a positioning apparatus, according to a fourth aspect of the invention, includes the steps of: receiving satellite signals by means of a positioning apparatus for positioning a current position based on the satellite signals from positioning satellites; obtaining satellite orbit information which indicates a satellite orbit of the positioning satellite and configured with a plurality of pieces of unit information by means of the positioning apparatus; obtaining time information by means of the positioning apparatus; estimating positioning time unit information which is the unit information received at positioning time by means of the positioning apparatus based on the satellite orbit information and the time information; generating polarity reversal rate information which indicates a rate of reversal of the polarity of a positioning standard code put on the satellite signals by means of the positioning apparatus based on the positioning time unit information; adjusting positioning standard code polarity for keeping or reversing the polarity of the positioning standard code by means of the positioning apparatus based on the polarity reversal rate information; performing coherent which is a processing of calculating a correlation integration value between the positioning standard code and a replica positioning standard code stored in the positioning apparatus by means of the positioning apparatus; generating incoherent information by performing incoherent which is a processing of integrating a plurality of correlation integration values by means of the positioning apparatus; and generating current position information which indicates a current position of the positioning apparatus by means of the positioning apparatus based on the incoherent information.

With the structure according to the fourth aspect of the invention, as with the structure according to the first aspect of the invention, it is possible to increase reception sensitivity of the positioning standard code despite that there is no accurate time information.

In order to achieve the above object, a control program for a positioning apparatus, according to a fifth aspect of the invention, instructing a computer to perform the steps of: receiving satellite signals by means of a positioning apparatus for positioning a current position based on the satellite signals from positioning satellites; obtaining satellite orbit information which indicates a satellite orbit of the positioning satellite and configured with a plurality of pieces of unit information by means of the positioning apparatus; obtaining time information by means of the positioning apparatus; estimating positioning time unit information which is the unit information received at positioning time by means of the positioning apparatus based on the satellite orbit information and the time information; generating polarity reversal rate information which indicates a rate of reversal of the polarity of a positioning standard code put on the satellite signals by means of the positioning apparatus based on the positioning time unit information; adjusting positioning standard code polarity for keeping or reversing the polarity of the positioning standard code by means of the positioning apparatus based on the polarity reversal rate information; performing coherent which is a processing of calculating a correlation integration value between the positioning standard code and a replica positioning standard code stored in the positioning apparatus by means of the positioning apparatus; generating incoherent information by performing incoherent which is a processing of integrating a plurality of correlation integration values by means of the positioning apparatus; and generating current position information which indicates a current position of the positioning apparatus by means of the positioning apparatus based on the incoherent information.

In order to achieve the above object, a computer readable recording medium for storing a control program for a positioning apparatus, according to a sixth aspect of the invention, instructing a computer to perform the steps of: receiving satellite signals by means of a positioning apparatus for positioning a current position based on the satellite signals from positioning satellites; obtaining satellite orbit information which indicates a satellite orbit of the positioning satellite and configured with a plurality of pieces of unit information by means of the positioning apparatus; obtaining time information by means of the positioning apparatus; estimating positioning time unit information which is the unit information received at positioning time by means of the positioning apparatus based on the satellite orbit information and the time information; generating polarity reversal rate information which indicates a rate of reversal of the polarity of a positioning standard code put on the satellite signals by means of the positioning apparatus based on the positioning time unit information; adjusting positioning standard code polarity for keeping or reversing the polarity of the positioning standard code by means of the positioning apparatus based on the polarity reversal rate information; performing coherent which is a processing of calculating a correlation integration value between the positioning standard code and a replica positioning standard code stored in the positioning apparatus by means of the positioning apparatus; generating incoherent information by performing incoherent which is a processing of integrating a plurality of correlation integration values by means of the positioning apparatus; and generating current position information which indicates a current position of the positioning apparatus by means of the positioning apparatus based on the incoherent information.

BRIEF DESCRIPTION OF THE DRAWINGS

The invention will be described with reference to the accompanying drawings, wherein like numbers reference like elements.

FIG. 1 schematically shows a terminal and the like in an embodiment according to the invention.

FIG. 2 schematically shows a main hardware structure of the terminal.

FIG. 5 illustrates an example of time information.

FIG. 6 schematically shows an example of a subframe.

FIG. 10 is a diagram for describing the polarity reversing program.

FIG. 12 is a diagram for describing an incoherent program.

FIG. 15 schematically shows a flowchart of an operation example of the terminal.

DESCRIPTION OF EXEMPLARY EMBODIMENTS

Figure 3:
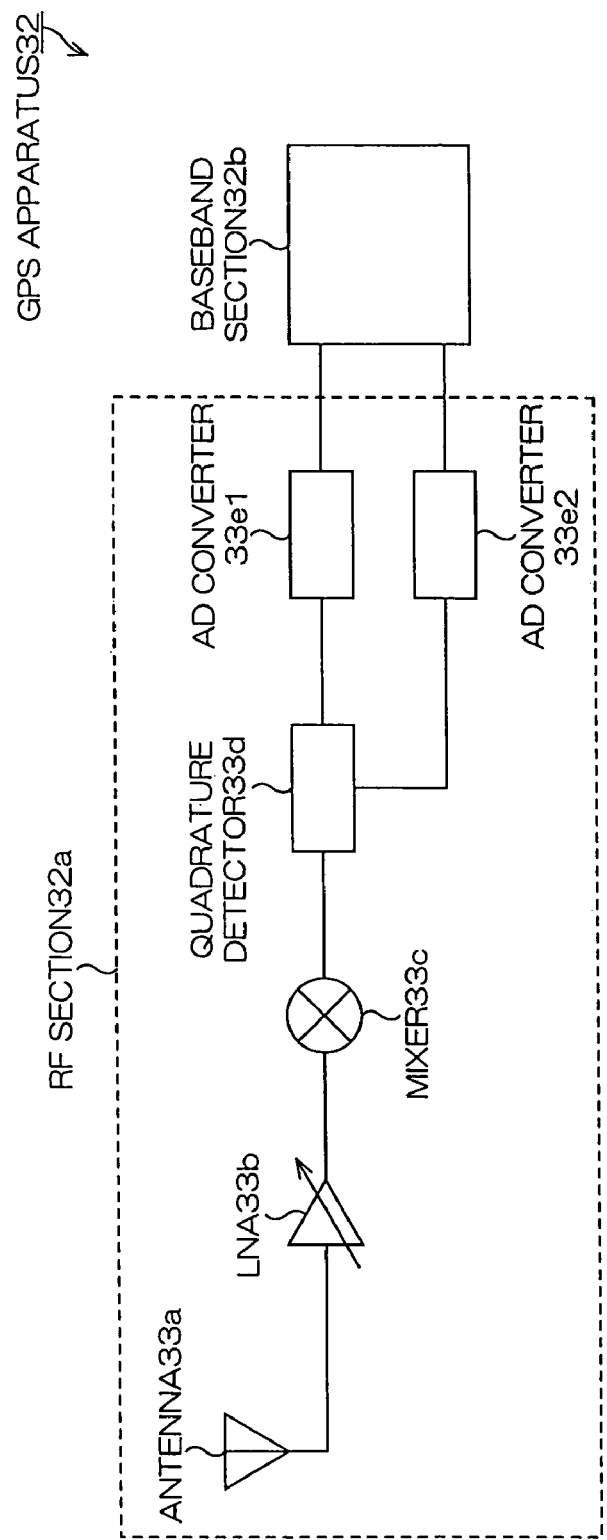
FIG. 3 schematically shows a structure of a GPS apparatus.

Hereinafter, with reference to the drawings, the preferred exemplary embodiments of the invention will be described in detail.

The following embodiments are given various limitations that are preferable technically because they are the exemplary specific examples of the invention, however, the scope of the invention is not limited to these aspects unless there is a particular description to limit the invention in the following description.

FIG. 1 schematically illustrates a terminal 20 and the like according to an embodiment of the invention.

As illustrated in FIG. 1, the terminal 20 can receive radio waves S1, S2, S3 and S4 from positioning satellites such as GPS satellites 12$a$, 12$b$, 12$c$ and 12$d$.

Each code is put on the radio waves S1 and the like. One of these codes is a C/A code Sca. The C/A code Sca is a signal with the bit rate of 1.023 Mbps, and the bit length of 1,023 bits (=1 msec). The terminal 20, which is an example of positioning apparatus for positioning a current position, positions a current position using the C/A code. The C/A code is an example of positioning standard code.

In addition, almanac Sal and ephemeris Seh are codes put on the radio waves S1 and the like. The almanac Sal is information which indicates a rough orbit of all GPS satellites 12$a$ and the like. The ephemeris Seh is information which indicates an accurate orbit of each of the GPS satellites 12$a$ and the like. The almanac Sal and the ephemeris Seh are collectively designated as navigation message.

Navigation message is a signal with the bit rate of 50 bps (i.e., bit length=20 msec), and is configured with multiple, for example, five subframes (not shown in the drawing). Subframe is a signal with the code length of 300 bits (=6 sec). The subframe is configured with multiple, for example, ten words. Word is a signal with the code length of 30 bits (=600 msec). The navigation message is an example of satellite orbit information. The subframe and word is an example of unit information.

The aforementioned C/A code and the navigation message is an example of satellite signals.

The C/A code is a unique code for every GPS satellite 12$a$ or the like, and the polarity thereof is reversed by the aforementioned navigation message. In other words, since the code length of the C/A code is 1 msec and the bit length of the navigation message is 20 msec, reversal of the polarity of the C/A code may occur for every 20 msec.

The terminal 20 receives C/A codes from three or more of different GPS satellites 12$a$ and the like, for example, allowing positioning of a current position.

First, the terminal 20 identifies which GPS satellite corresponds to the received C/A code. Next, the phase of the C/A code is identified, and the distance (hereinafter, referred to as pseudo range) between each of the GPS satellites 12a and the like and the terminal 20 is thereby calculated. A current position is then positioned based on the position of each of the GPS satellites 12a and the like on the satellite orbit at the current time and the above-mentioned pseudo range.

The terminal 20 performs coherent processing and incoherent processing to be described later to identify the phase of the aforementioned C/A code.

Main Hardware Structure of Terminal 20

FIG. 2 schematically illustrates a main hardware structure of the terminal 20.

As illustrated in FIG. 2, the terminal 20 includes a computer, which is equipped with a bus 22. A CPU (Central Processing Unit) 24, a storage apparatus 26, and the like are connected with the bus 22. The storage apparatus 26 may be a RAM (Random Access Memory), a ROM (Read Only Memory), or the like.

An input apparatus 28, a power supply apparatus 30, a GPS apparatus 32, a display apparatus 34, a communication apparatus 36, and a clock 38 are also connected with the bus 22. The clock 38 is a clock with time accuracy of approximately 5 through 6 seconds.

Structure of GPS Apparatus 32

FIG. 3 schematically illustrates a structure of the GPS apparatus 32.

As illustrated in FIG. 3, the GPS apparatus 32 is configured with an RF section 32a and a baseband section 32b.

The RF section 32a receives the radio waves S1 and the like via an antenna 33a. An LNA 33b which is an amplifier then amplifies signals such as C/A codes and the like put on the radio wave S1. A mixer 33C then down converts the frequencies of the signals. A quadrature (IQ) detector 33d then performs IQ separation of the signals. Subsequently, A/D converters 33e1 and 33e2 convert the IQ separated signals into digital signals, respectively.

The baseband section 32b receives the signals converted into digital signals from the RF section 32a, samples and integrates each chip (not shown in the drawing) of the signals, and correlates them with the C/A codes stored in the baseband section 32b, thereby identifying the received C/A codes.

Main Software Structure of Terminal 20

Figure 4:
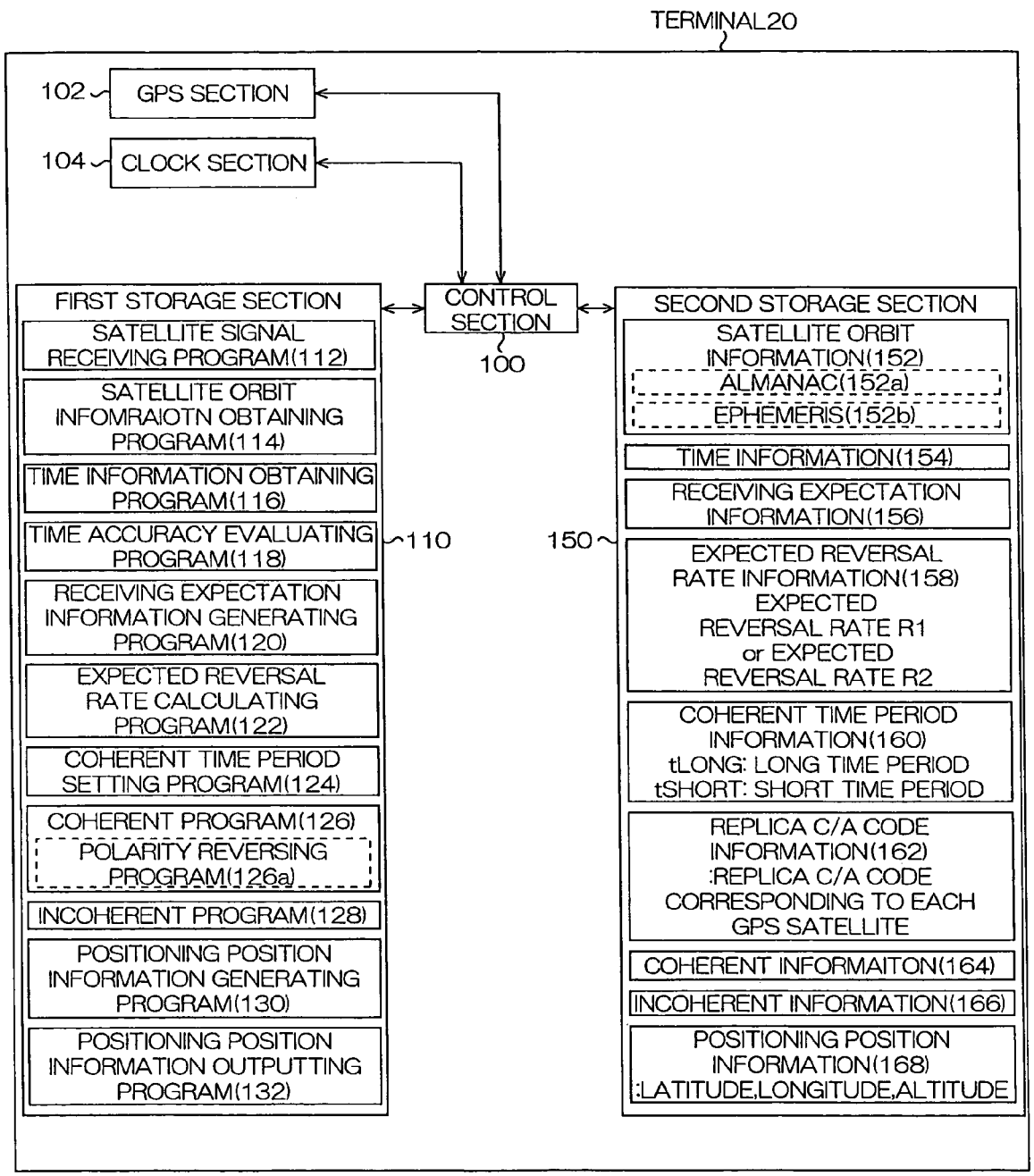
FIG. 4 schematically shows a main software structure of the terminal.

FIG. 4 schematically illustrates a main software structure of the terminal 20.

As illustrated in FIG. 4, the terminal 20 includes a control section 100 for controlling each section, a GPS section 102 corresponding to the GPS apparatus 32 in FIG. 2, a clock section 104 corresponding to the clock 38, and the like.

The terminal 20 also includes a first storage section 110 for storing each program and a second storage section 150 for storing each information.

As illustrated in FIG. 4, the terminal 20 stores a navigation message 152 in the second storage section 150. The navigation message 152 include almanac 152a and ephemeris 152b.

The terminal 20 uses the almanac 152a and the ephemeris 152b for positioning.

As illustrated in FIG. 4, the terminal 20 stores a satellite signal receiving program 112 in the first storage section 110. The satellite signal receiving program 112 is a program that the control section 100 receives the C/A codes and the like put on the radio waves S1 and the like from the GPS satellites 12a and the like using the GPS section 102. In other words, the satellite signal receiving program 112 and the control section 100 is an example of satellite signal receiving means.

As illustrated in FIG. 4, the terminal 20 stores a satellite orbit information obtaining program 114 in the first storage section 110. The satellite orbit information obtaining program 114 is a program that the control section 100 obtains, for example, the ephemeris 152b from the second storage section 150. In other words, the satellite orbit information obtaining program 114 and the control section 100 is an example of satellite orbit information obtaining means.

The invention is not limited to this embodiment, the control section 100 may communicate with an external server which is not shown in the drawing using the communication apparatus 36 (see FIG. 2) to obtain ephemeris therefrom.

As illustrated in FIG. 4, the terminal 20 stores a time information obtaining program 116 in the first storage section 110. The time information obtaining program 116 is a program that the control section 100 obtains time information 154 which indicates the current time. The time information 154 is an example of time information. The time information obtaining program 116 and the control section 100 is an example of time information obtaining means.

The control section 100 obtains the time information 154 from the clock section 104 or the received radio waves S1 and the like. The time accuracy when the time information 154 is obtained from the clock section 104 is 5 through 6 seconds. The time accuracy when the time information 154 is obtained using a Zcount of navigation message put on the radio wave S1 or the like is, for example, 5 msec.

FIG. 5 illustrates an example of the time information 154.

FIG. 5(a) illustrates time information 154a which is obtained from the clock section 104 by the control section 100.

As illustrated in FIG. 5(a), the time information 154a is information which indicates a current time t and the time accuracy of ±5 seconds (s).

FIG. 5(b) illustrates time information 154b which is obtained from the signal S1 or the like by the control section 100.

As illustrated in FIG. 5(b), the time information 154b is information which indicates a current time t and the time accuracy of ±5 msec.

In the aforementioned time information 154a and 154b, the current time t is an example of current time information, and the time accuracy is an example of time accuracy information.

As illustrated in FIG. 4, the terminal 20 stores a time accuracy evaluating program 118 in the first storage section 110. The time accuracy evaluating program 118 is a program that the control section 100 selects subframes or words of the navigation message 152 based on the time accuracy indicated in the time information 154. The time accuracy evaluating program 118 and the control section 100 is an example of unit information type selecting means.

For example, the control section 100 selects words if the time accuracy falls within ±50 msec, or selects subframes if the time accuracy does not fall within ±50 msec.

As illustrated in FIG. 4, the terminal 20 stores a receiving expectation information generating program 120 in the first storage section 110. The receiving expectation information generating program 120 is a program that the control section 100 expects subframes or words to be used at positioning time based on the navigation message 152 and the time information 154, and generates receiving expectation information 156. The receiving expectation information 156 is an example of positioning time unit information. The receiving expectation information generating program 120 and the control section 100 is an example of positioning time unit information estimating means.

FIG. 6 illustrates an example of subframe.

For example, as illustrated in FIG. 6, the control section 100 uses the ephemeris 152b, expects that a subframe SF1 is received at positioning time t(n), and generates the receiving expectation information 156 which indicates the subframe SF1.

The control section 100 stores the generated receiving expectation information 156 in the second storage section 150.

It should be noted that each subframe is actually configured with 300 bits, for example, however, it is configured with 12 bits in the drawing for convenience of description.

As illustrated in FIG. 4, the terminal 20 stores an expected reversal rate calculating program 122 in the first storage section 110. The expected reversal rate calculating program 122 is a program that the control section 100 generates expected reversal rate information 158 which indicates an expected reversal rate R1 or R2, which is a rate of reversal of the polarity of the C/A code used for positioning, based on the receiving expectation information 156. The expected reversal rate information 158 is an example of polarity reversal rate information. The expected reversal rate calculating program 122 and the control section 100 is an example of polarity reversal rate information generating means.

Figure 7:
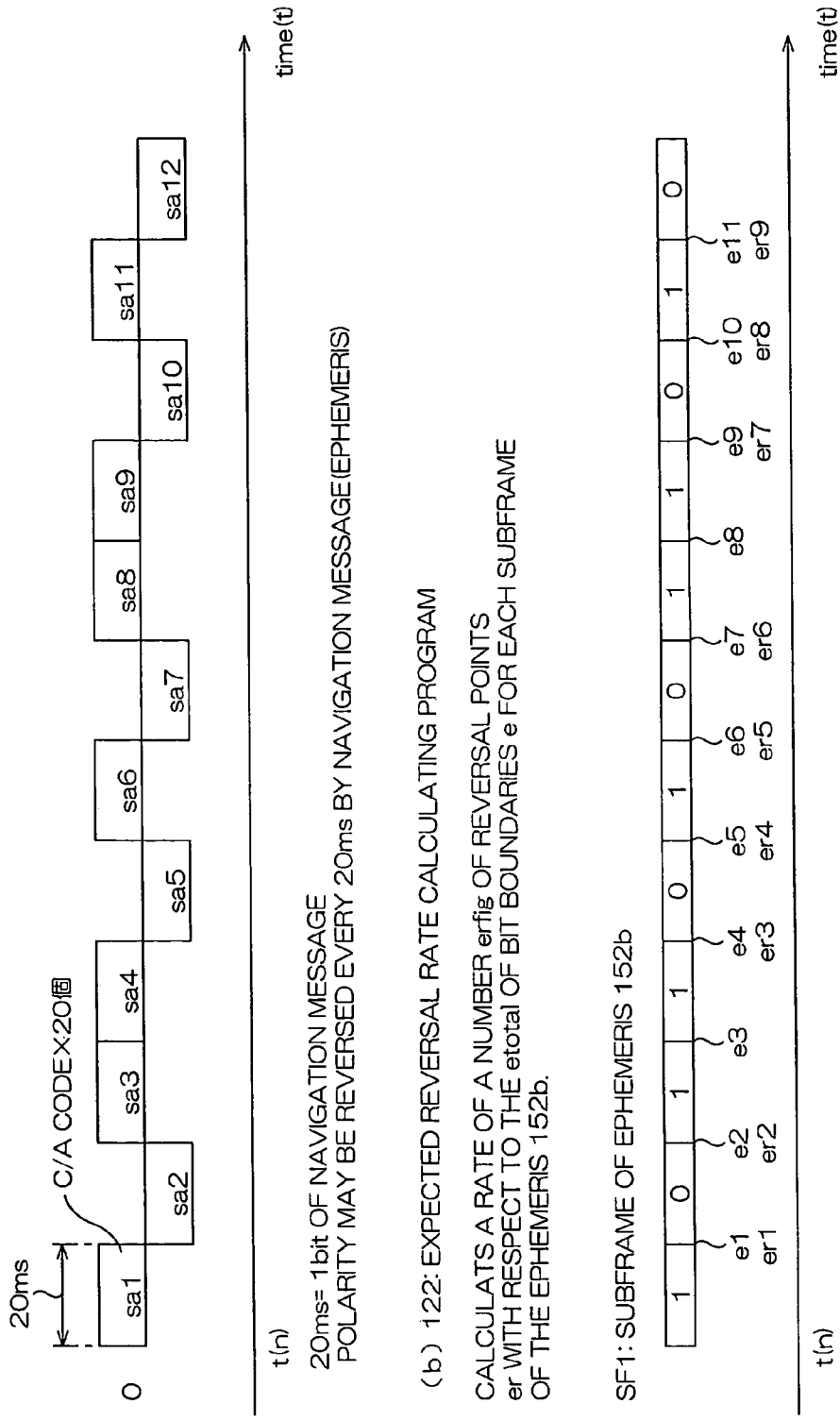
FIG. 7 schematically shows an example of a C/A code.

FIG. 7 schematically illustrates an example where the polarity of the C/A code is reversed.

As illustrated in FIG. 7(a), for example, the polarity of the C/A code put on the radio wave S1 is not reversed or reversed for every 20 msec by each of bits Sa1 through Sa12 of the subframe SF1.

The expected reversal rate calculating program 122 is described forthwith using FIG. 7(b).

The control section 100 calculates a rate of a number erfig of reversal points er with respect to the total number etotal of bit boundaries e for each subframe of the ephemeris 152b based on the expected reversal rate calculating program 122. Here, the reversal points er mean points where bit changes. For example, the reversal points er are points where bit changes from 1 to 0 or from 0 to 1. The C/A code is also reversed at the reversal points er.

For example, in the subframe SF1 in FIG. 7(b), the expected reversal rate R1 of 81.8% is calculated from the total number etotal of the boundaries e of eleven, and the number erfig of the reversal points er of nine.

It should be noted that the control section 100 calculates the expected reversal rate R2 when words, which configure a subframe, instead of subframes are used.

The control section 100 stores the expected reversal rate information 158 which indicates the calculated expected reversal rate R1 or R2 in the second storage section 150.

As illustrated in FIG. 4, the terminal 20 stores a coherent time period setting program 124 in the first storage section 110. The coherent time period setting program 124 is a program that the control section 100 determines a coherent time for performing coherent based on the expected reversal rate information 158 and generates coherent time period information 160. The coherent time period setting program 124 and the control section 100 is an example of coherent time period deciding means.

Figure 8:
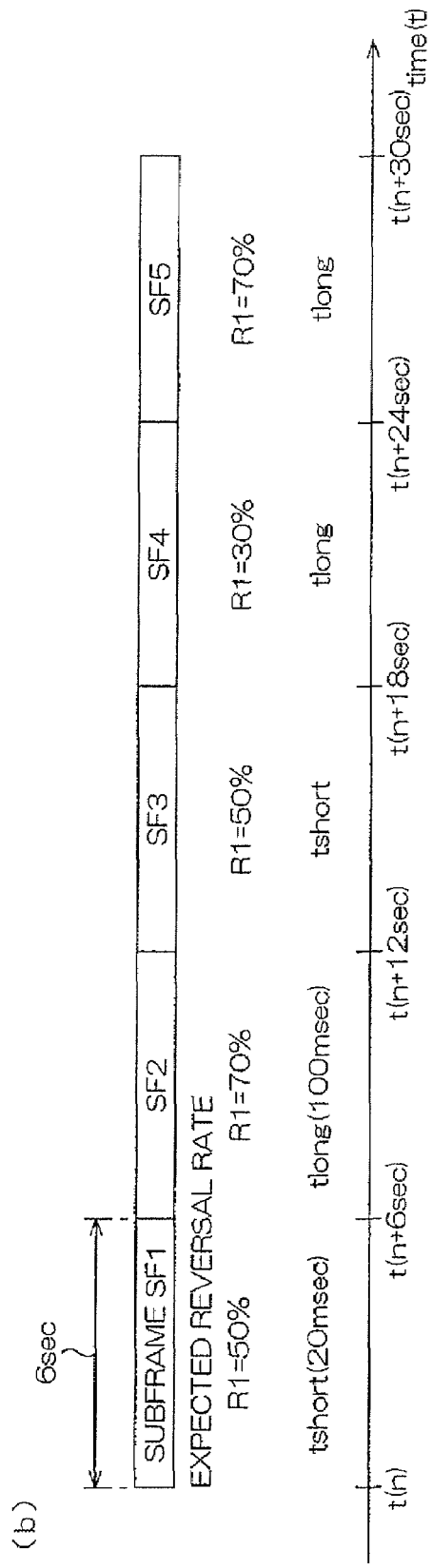
FIG. 8 is a diagram for describing a coherent time period setting program.

FIG. 8 is a diagram for describing the coherent time period setting program 124.

As illustrated in FIG. 8(a), the control section 100 sets the coherent time period to tlong, that is, 100 msec if, for example, the expected reversal rate R1 (or R2) is 0% or more and less than 30%, based on the coherent time period setting program 124. The control section 100 sets the coherent time period to tlong if the expected reversal rate R1 (or R2) is 70% or more. The control section 100 sets the coherent time period to tshort, that is, 20 msec if the expected reversal rate R1 (or R2) is 30% or more and less than 70%.

As illustrated in FIG. 8(b), the control section 100 sets coherent time periods for each of subframes SF1 through SF5 which are received sequentially, for example.

As illustrated in FIG. 8(b), the coherent time period information 160 is information which indicates coherent time periods set for each of subframes SF1 through SF5 which are received sequentially.

The control section 100 stores the generated coherent time period information 160 in the second storage section 150.

As illustrated in FIG. 4, the terminal 20 stores a coherent program 126 in the first storage section 110. The coherent program 126 is a program that the control section 100 performs coherent which is a processing of calculating correlation integration values between the received C/A code and the replica C/A code which is indicated in replica C/A code information 162 stored in the second storage section 150 in advance, and generates coherent information 164 which indicates the correlation integration values. The replica C/A code, which is an example of replica positioning standard code, is corresponded with each GPS satellite 12a or the like, and then stored. In other words, a number of replica C/A codes corresponds to a number of GPS satellites 12a and the like. The aforementioned coherent program 126 and the control section 100 is an example of coherent means.

As illustrated in FIG. 4, the coherent program 126 includes a polarity reversing program 126a. The polarity reversing program 126a is a program that the control section 100 keeps or reverses the polarity of the C/A codes to be received based on the expected reversal rate information 158. In other words, the polarity reversing program 126a and the control section 100 is an example of positioning standard information polarity adjusting means.

Figure 9:
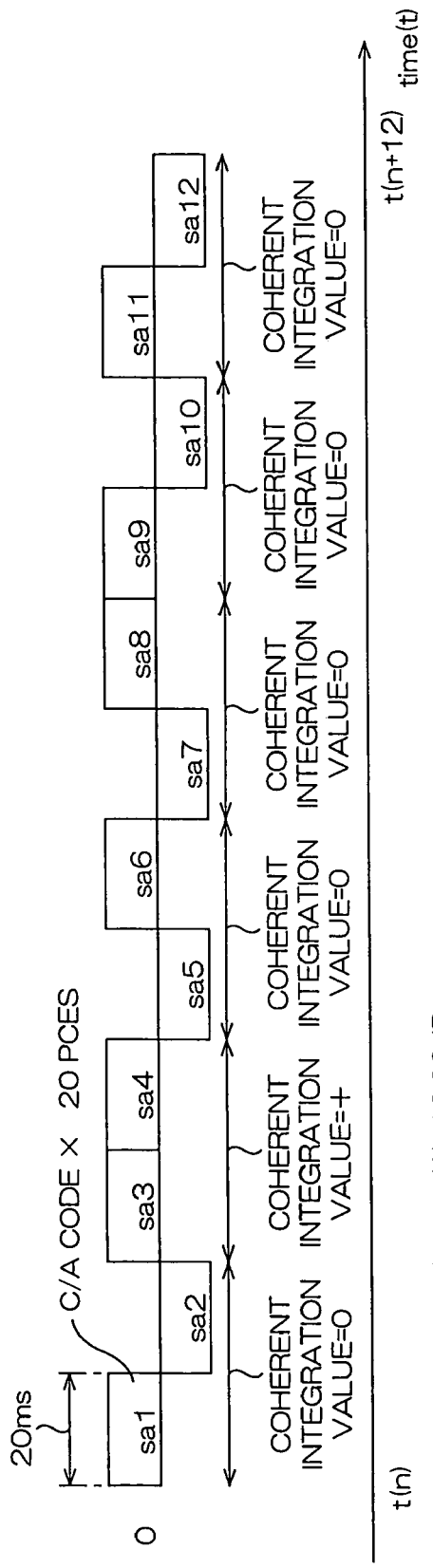
FIG. 9 is a diagram for describing a polarity reversing program.

FIGS. 9 and 10 are diagrams for describing the polarity reversing program 126a.

The reception sensitivity of the C/A code is calculated using formula 1 shown in FIG. 9(a).

As illustrated in FIG. 9(b), the polarity of the C/A code is reversed by each bit Sa1 or the like of the subframe SF1.

Accordingly, for example, if coherent of 40 msec is performed for the received C/A code without any changes, which is different from this embodiment, the correlation value of the C/A code corresponding to Sa1 and the correlation value of the C/A code corresponding to Sa2 compensate each other, resulting in decrease in the reception sensitivity calculated by formula 1 in FIG. 9(a).

According to this embodiment, as illustrated in FIG. 10(a), the polarity of the C/A code is not reversed or reversed by generating and multiplying data strings corresponding to each of bits Sa1 and the like of the subframe SF1 by the received C/A code.

FIG. 10(b) illustrates the C/A code obtained by multiplying data strings by received C/A code.

In this case, for example, if coherent of 40 msec is performed, it is possible to decrease the number of times that the C/A codes compensate each other, resulting in an increase in the reception sensitivity.

More specifically, an example of the reception sensitivity according to a method different from the embodiment is 16.02 dB (see FIG. 9(b)). On the other hand, an example of the reception sensitivity according to a method of the embodiment is 19.51 dB (see FIG. 10(b)). It is apparent that the reception sensitivity reliably increases.

Figure 11:
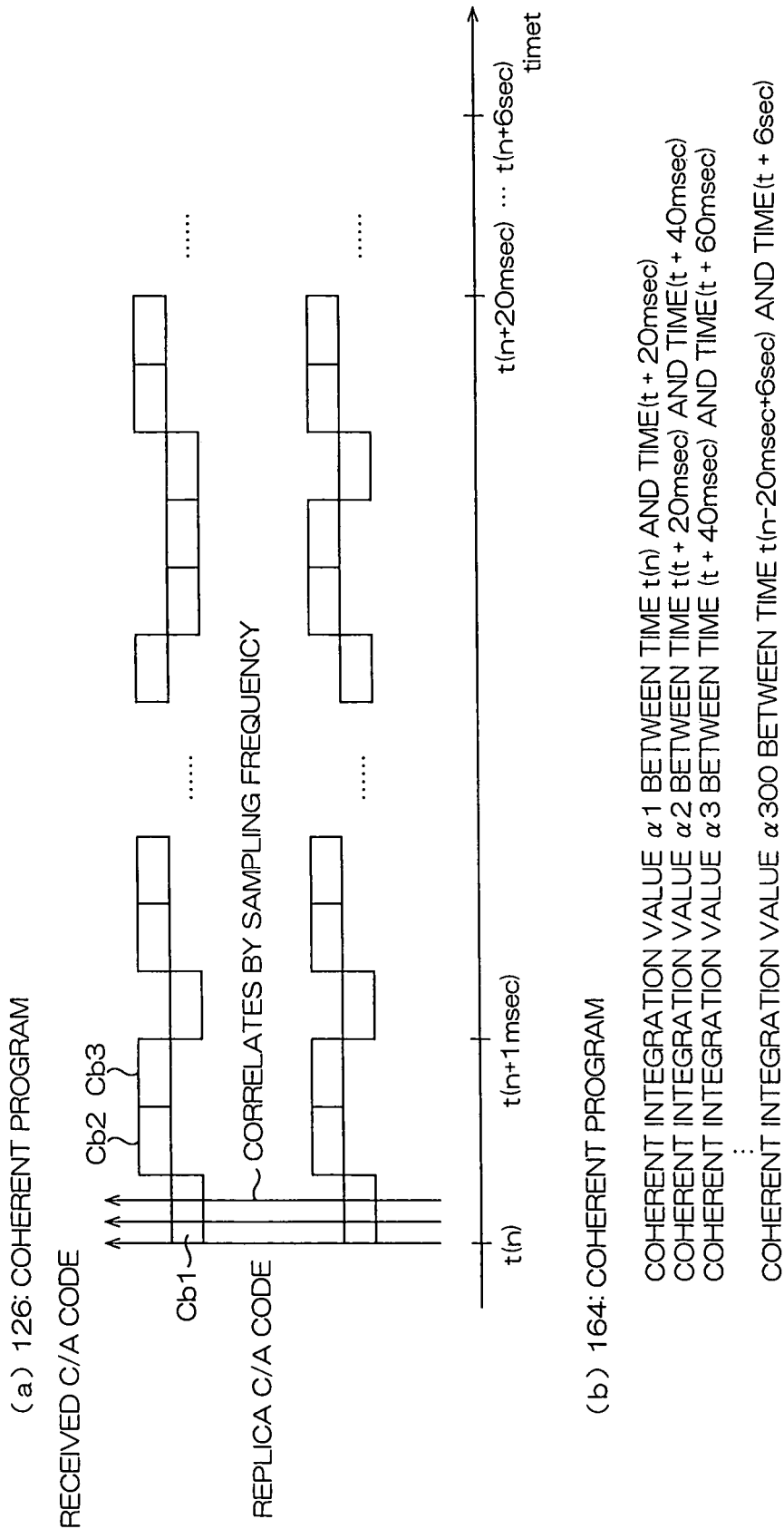
FIG. 11 is a diagram for describing a coherent program.

FIG. 11 is a diagram for describing the coherent program 126.

As illustrated in FIG. 11(a), the control section 100 correlates each chip Cb1 or the like of the received C/A code with each chip of the replica C/A code by sampling frequencies based on the coherent program 126.

For example, if the coherent time is 20 msec, the correlation integration values α1 and the like during the time period of 20 msec are calculated and the coherent information 164 which indicates each of correlation integration values α1 and the like is generated.

The control section 100 performs coherent based on the coherent time period determined by the aforementioned coherent time period setting program 124.

The control section 100 stores the generated coherent information 164 in the second storage section 150.

As illustrated in FIG. 4, the terminal 20 stores an incoherent program 128 in the first storage section 110. The incoherent program 128 is a program that the control section 100 performs incoherent which is a processing of integrating multiple correlation integration values and generates incoherent information 166. The incoherent program 128 and the control section 100 is an example of incoherent information generating means.

FIG. 12 is a diagram for describing the incoherent program 128.

As illustrated in FIG. 12, the control section 100 integrates the correlation integration values α1 and the like based on the incoherent program 128 to calculate an incoherent value β, and generates the incoherent information 166 which indicates the incoherent value β.

The control section 100 stores the generated incoherent information 166 in the second storage section 150.

As illustrated in FIG. 4, the terminal 20 stores a positioning position information generating program 130 in the first storage section 110. The positioning position information generating program 130 is a program that the control section 100 generates positioning position information 168 which indicates a current position of the terminal 20 based on the incoherent information 166. The positioning position information 168 is an example of current position information. The positioning position information generating program 130 and the control section 100 is an example of current position information generating means.

More specifically, the control section 100 determines the code peak of the C/A code based on the incoherent value, and calculates the phase of the C/A code which is being received. The distance (pseudo range) between each of GPS satellites 12*a* and the like and the terminal 20 is calculated using the phase of the C/A code. The current position is calculated based on at least three pseudo ranges and positions of corresponding GPS satellites 12*a* and the like on the satellite orbit. It should be noted that the positions of the GPS satellites 12*a* and the like on the satellite orbit are calculated using the ephemeris 152*b*.

The control section 100 stores the generated positioning position information 168 in the second storage section 150.

As illustrated in FIG. 4, the terminal 20 stores a positioning position information outputting program 132 in the first storage section 110.

The positioning position information outputting program 132 is a program that the control section 100 displays the positioning position information 168 on the display apparatus 34 (see FIG. 2).

The terminal 20 is configured as described above.

As described above, the terminal 20 can generate the expected reversal rate information 158, and keep or reverse the polarity of the received C/A code.

In addition, the terminal 20 can perform coherent which is a processing of calculating correlation integration values between the replica C/A code and the polarity-not-reversed or -reversed C/A code, further perform incoherent, and generate the positioning position information 168.

As described above, the terminal 20 performs coherent using the polarity-not-reversed or -reversed C/A code, allowing reduction in the number of times that the correlation values of the C/A code compensate each other.

This allows increase in the reception sensitivity indicated in the incoherent information 166 and generation of the accurate positioning position information 168.

As described above, the terminal 20 expects subframes at positioning time, generates the expected reversal rate information 158, and does not reverse or reverses the polarity of the C/A code based on the expected reversal rate information 158. Therefore, there is no useless processing which is not used for positioning, and there is no need to accumulate a large amount of data.

In addition, since it is only necessary for the time accuracy of the time information 154 that can expect subframes to be used at positioning time, accurate time information is unnecessary.

This allows increase in reception sensitivity of positioning standard code despite that there is no need to accumulate a large amount of data and there is no accurate time information.

In addition, the terminal 20 can determine the coherent time period based on the expected reversal rate information 158, and thus the coherent time period can be set so as to increase the reception sensitivity according to the expected reversal rate information 158.

It should be noted that if the control section 100 of the terminal 20 determines that the time accuracy falls within 50 msec using the aforementioned time accuracy evaluating program 118, words to be received is expected using the receiving expectation information generating program 120.

Figure 13:
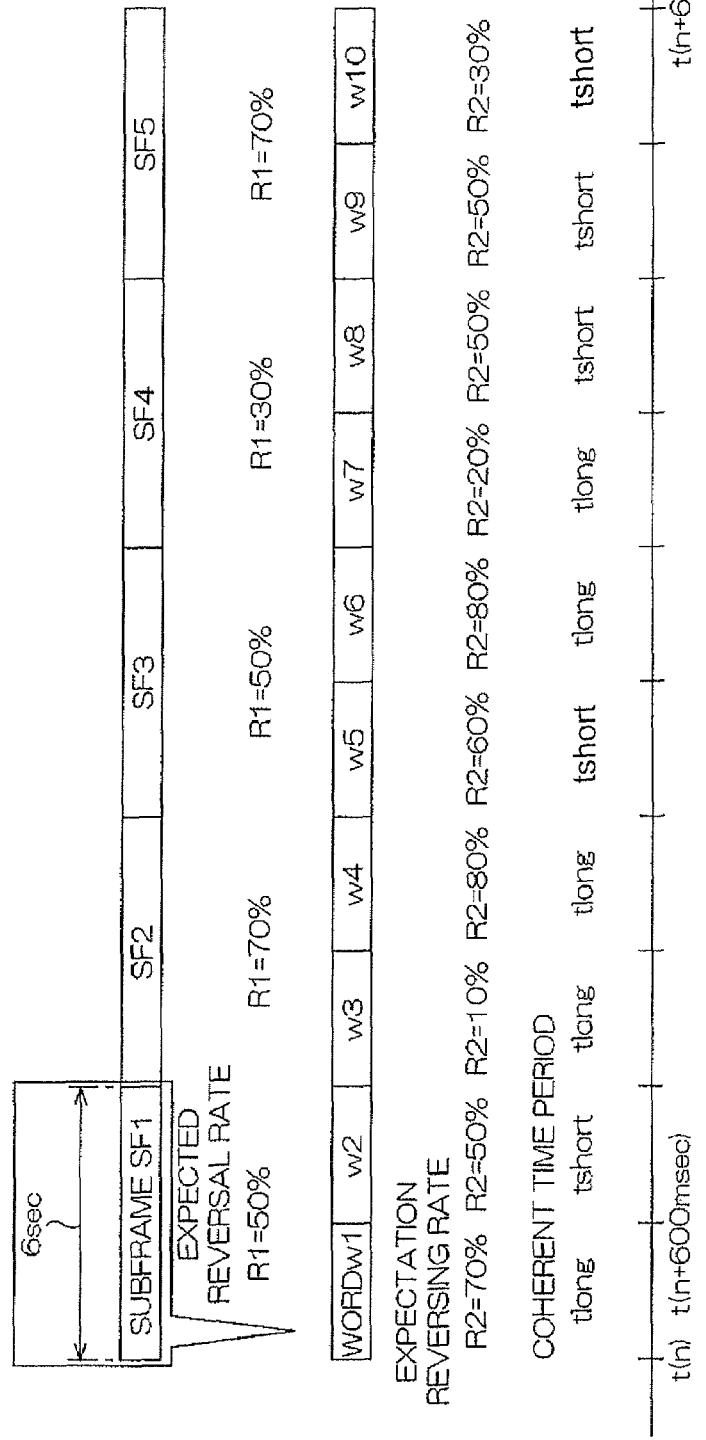
FIG. 13 is a diagram for describing a case where it is determined that time accuracy falls within 50 msec.

FIG. 13 is a diagram for describing a case where it is determined that the time accuracy falls within 50 msec using the time information evaluating program 118.

As illustrated in FIG. 13, when the control section 100 determines that the time accuracy falls within 50 msec, a WORD w1 or the like to be received is expected, and the expected reversal rate R2 is calculated based on bits of each WORD w1 or the like.

The coherent time period is then determined based on the expected reversal rate R2. In addition, the polarity of the C/A code to be received is not reversed or reversed based on the expected reversal rate R2.

The shorter the code length (time period), the more accurate the expected reversal rate information 158 is generated, allowing adjustment of the polarity of the C/A code and determination of the coherent time period.

This allows further increase in the reception sensitivity of the C/A code.

The structure of the terminal 20 in the embodiment according to the invention is described above. The operation example is hereinafter described mainly using FIGS. 14 and 15.

Figure 14:
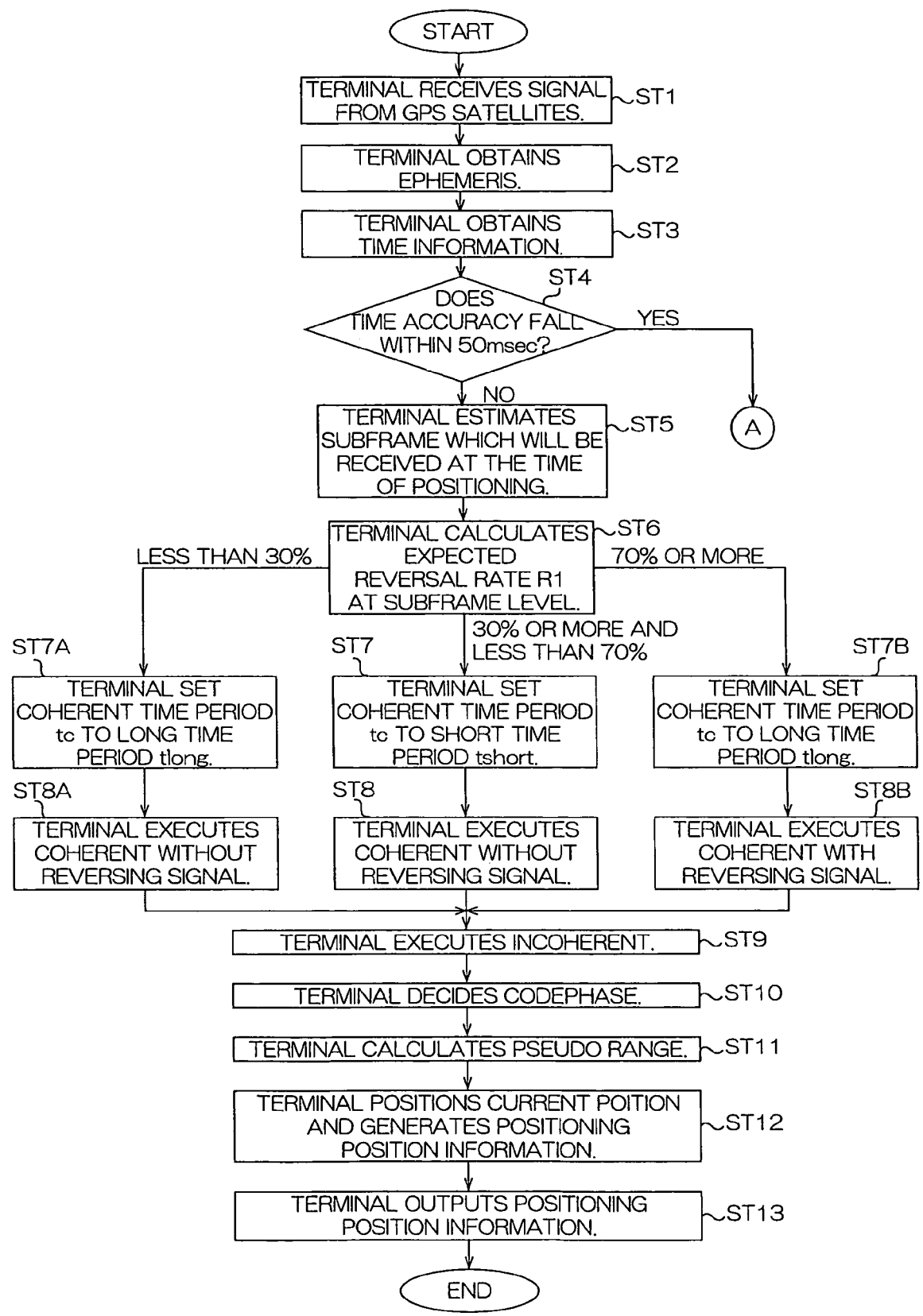
FIG. 14 schematically shows a flowchart of an operation example of the terminal.

FIGS. 14 and 15 schematically illustrate flowcharts of an operation example of the terminal 20.

First, the terminal 20 receives a C/A code put on the radio waves S1 and the like from the GPS satellites 12*a* and the like, for example (step ST1 in FIG. 14). The step ST1 is an example of the step of receiving satellite signals.

Subsequently, the terminal 20 obtains the ephemeris 152*b* (see FIG. 4) from the second storage section 150 (step ST2).

The step ST2 is an example of the step of obtaining satellite orbit information.

The terminal 20 then obtains the time information 154 (see FIG. 4) (step ST3). The step ST3 is an example of the step of obtaining time information.

Next, the terminal 20 determines whether or not the time accuracy indicated in the time information 154 falls within 50 msec (step ST4). In step ST4, if it is determined that the time accuracy falls within 50 msec, the process proceeds to step ST105 in FIG. 15.

On the other hand, if it is determined that the time accuracy indicated in the time information 154 does not fall within 50 msec, the terminal 20 expects subframes to be received at positioning time (step ST5 in FIG. 14). The step ST5 is an example of the step of estimating unit information.

Afterwards, the terminal 20 calculates the expected reversal rate R1 at a subframe level (step ST6 in FIG. 14). The step ST6 is an example of the step of generating polarity reversal rate information.

Next, the terminal 20 sets a coherent time period tc based on the expected reversal rate R1 (steps ST7, ST7A, ST7B).

The terminal 20 then does not reverse or reverses the polarity of the C/A code and performs coherent based on the expected reversal rate R1 (steps ST8, ST8A, ST8B). The steps ST8A and the like is an example of the step of performing coherent, and are also an example of the step of adjusting positioning standard code polarity.

Subsequently, the terminal 20 performs incoherent (step ST9). The step ST9 is an example of the step of generating incoherent information.

Next, the terminal 20 determines a code phase (step ST10), calculates a pseudo range (step ST11), and generates the positioning position information 168 (see FIG. 4) (step ST12). The steps ST10 through ST12 is an example of the step of generating current position information.

The terminal 20 then outputs the positioning position information 168 (step ST13).

In the aforementioned step ST4, if it is determined that the time accuracy falls within 50 msec, the process proceeds to step ST105 in FIG. 15.

The steps following the step ST105 are the same as those following the step ST5 except that the processing is performed based on words instead of based on subframes, and thus description thereof is omitted.

The aforementioned steps allow increase in the reception sensitivity of the positioning standard code despite that there is no accurate time information.

The present invention is not limited to the above-described respective embodiments. Further, the above-described respective embodiments may be combined with each other.

What is claimed is:

1. A control method of a positioning apparatus, comprising:
   receiving satellite signals including a positioning standard code from positioning satellites, the polarity of the positioning standard code being reversed according to data bits that indicates navigation message data;
   estimating a subframe that forms the navigation massage data and is received by the positioning apparatus;
   calculating a polarity reversal rate that indicates a rate of reversal of the polarity of the positioning standard code based on a value of each bit of the subframe;
   reversing the polarity of the positioning standard code on the basis of the polarity reversal rate;
   integrating a correlation value between the positioning standard code of which the polarity has been reversed and a replica positioning standard code stored in the positioning apparatus for a given integration time to calculate a correlation integration value;
   integrating the calculated correlation integration value to generate an integrated correlated integration value; and
   performing positioning calculations based on the integrated correlation integration value.

2. The control method according to claim 1, further comprising:
   changing the given integration time based on the reversal rate.

3. The control method according to claim 1, wherein
   the reversing the polarity of the positioning standard code includes reversing the polarity of the positioning standard code every second bit when the polarity reversal rate is equal to or higher than a given value.

4. A control method of a positioning apparatus, comprising:
   receiving satellite signals including a positioning standard code from positioning satellites, the polarity of the positioning standard code being reversed according to data bits that indicate navigation message data;
   estimating a word that forms the navigation massage data and is received by the positioning apparatus;
   calculating polarity reversal rate that indicates a rate of reversal of the polarity of the positioning standard code based on a value of each bit of the word;
   reversing the polarity of the positioning standard code on the basis of the polarity reversal rate;
   integrating correlation value between the positioning standard code of which the polarity has been reversed and a replica positioning standard code stored in the positioning apparatus for a given integration time to calculate a correlation integration value;
   integrating the calculated correlation integration values to generate an integrated correlated integration value; and
   performing positioning calculations based on the integrated correlation integration value.

5. The control method according to claim 4, further comprising
   changing the given integration time based on the reversal rate.

6. The control method according to claim 4, wherein
   the reversing the polarity of the positioning standard code includes reversing the polarity of the positioning standard code every second bit when the polarity reversal rate is equal to or higher than a given value.

7. A control method of a positioning apparatus, comprising:
   receiving satellite signals including a positioning standard code from positioning satellites, the polarity of the positioning standard code being reversed according to date bits that indicate navigation massage data;
   selecting subframe or a word that forms the navigation message data;
   calculating a polarity reversal rate that indicates a rate of reversal of the polarity of the positioning standard code based on a value of each bit of the selected subframe or word;
   reversing the polarity of the positioning standard code on the basis of the polarity reversal rate;
   integrating a correlation value between the positioning standard code of which the polarity has been reversed and a replica positioning standard coded stored in the positioning apparatus for a given integration time to calculate a correlation integration value;

integrating the calculated correlation integration values to generate an integrated correlated integration value; and performing positioning calculations based on the integrated correlation integration value.

8. The control method according to claim 7, wherein
the reversing the polarity of the positioning standard code includes reversing the polarity of the positioning standard code every second bit when the polarity reversal rate is equal to or higher than a given value.

* * * * *